United States Patent
Bayer et al.

(10) Patent No.: US 10,201,933 B2
(45) Date of Patent: Feb. 12, 2019

(54) SUPPORT MATERIALS FOR 3D PRINTING

(71) Applicant: Dow Global Technologies LLC, Midland, MI (US)

(72) Inventors: Roland Bayer, Walsrode (DE); Anette Wagner, Walsrode (DE); Aleksander J. Pyzik, Midland, MI (US); Sharon Allen, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/580,206

(22) PCT Filed: Jun. 2, 2016

(86) PCT No.: PCT/US2016/035463
§ 371 (c)(1),
(2) Date: Dec. 6, 2017

(87) PCT Pub. No.: WO2016/200673
PCT Pub. Date: Dec. 15, 2016

(65) Prior Publication Data
US 2018/0147785 A1    May 31, 2018

Related U.S. Application Data

(60) Provisional application No. 62/172,850, filed on Jun. 9, 2015.

(51) Int. Cl.
| | |
|---|---|
| B29C 64/40 | (2017.01) |
| B33Y 70/00 | (2015.01) |
| B33Y 10/00 | (2015.01) |
| C09D 101/28 | (2006.01) |
| C08L 1/28 | (2006.01) |
| B29K 1/00 | (2006.01) |
| B29K 101/12 | (2006.01) |

(52) U.S. Cl.
CPC .............. *B29C 64/40* (2017.08); *B33Y 70/00* (2014.12); *C08L 1/284* (2013.01); *C09D 101/284* (2013.01); *B29K 2001/08* (2013.01); *B29K 2101/12* (2013.01); *B29K 2995/0062* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 3,709,876 A | 1/1973 | Glomski et al. | |
| 4,316,982 A | 2/1982 | Holst et al. | |
| 5,121,329 A | 6/1992 | Crump | |
| 5,503,785 A | 4/1996 | Crump et al. | |
| 6,070,107 A | 5/2000 | Lombardi et al. | |
| 7,081,255 B2* | 7/2006 | Baert | A61K 9/146 424/480 |
| 9,962,446 B2* | 5/2018 | Grasman | A61K 9/146 |
| 2003/0107158 A1* | 6/2003 | Levy | B29C 67/24 264/494 |
| 2004/0242862 A1 | 12/2004 | Hammes | |
| 2008/0255020 A1 | 10/2008 | Holderbaum | |
| 2010/0228019 A1 | 9/2010 | Umemoto et al. | |
| 2013/0083276 A1 | 4/2013 | Iwahashi et al. | |
| 2015/0065548 A1* | 3/2015 | Adden | A61K 9/08 514/391 |
| 2015/0140091 A1* | 5/2015 | Grasman | A61K 9/146 424/463 |

FOREIGN PATENT DOCUMENTS

| | | |
|---|---|---|
| EP | 210917 A2 | 2/1987 |
| EP | 1141029 B1 | 5/2003 |
| EP | 1423433 B1 | 3/2007 |
| JP | 2015101560 | 6/2015 |
| WO | 2004113042 A2 | 12/2004 |
| WO | 2009044118 A2 | 4/2009 |

OTHER PUBLICATIONS

United States Pharmacopeia (USP 38, "Hypromellose", pp. 3824-3826).

* cited by examiner

*Primary Examiner* — Sheeba Ahmed

(57) ABSTRACT

A three-dimensionally printed article is comprised of a hydroxyethyl methylcellulose (HEMC) having a DS of 1.7 to 2.5 and an MS of at least 0.5, wherein DS is the degree of substitution of methoxyl groups and MS is the molar substitution of hydroxyethoxyl groups. The HEMC may advantageously be used as a support material when making a three-dimensionally printed article using a build material such as a different thermoplastic polymer such as a poly (acrylonitrile-butadiene-styrene), polylactic acid, polyethylene and polyprophylene. When the HEMC is a support material it may be easily removed from the build material by contacting the three dimensionally printed article with water, which may be at ambient temperatures and a pH that is neutral or close to neutral.

19 Claims, No Drawings

SUPPORT MATERIALS FOR 3D PRINTING

FIELD

The present invention relates to three-dimensionally printed articles and a method of printing a three-dimensional article.

BACKGROUND

Commercially available three-dimensional printers (3D), such as the Projet™ 3D Printers manufactured by 3D Systems of Rock Hill, S.C., use a build material or ink that is jetted through a nozzle as a liquid to form various thermopolymer parts. Other printing systems are also used to build 3D parts from material that is extruded through a nozzle (for example, CubePro 3D Printer manufactured by 3D Systems). In some instances, the build material is solid at ambient temperatures and converts to liquid at elevated extrusion temperatures. Well-known build materials are polyamide, poly(acrylonitrile-butadiene-styrene) (ABS) and polylactic acid (PLA).

Production of a three-dimensional part in a 3D printing system often requires the use of a support material in conjunction with the build material. The support material may be necessary to support overhanging segments or portions which are not directly supported in the final geometry by the build material. The support material may be useful for several other purposes, e.g., to minimize warping from the build material's own load, to produce hollow sections, and/or to enable several moving components in the same part. The support material is also extruded in the same fashion as the build material through a separate nozzle. However, unlike the build material, the support material is subsequently removed after printing to provide the finished three-dimensional part. The support material should be removable without damaging the printed build material.

Removal of the support material has been administered through several processes, including heating the support material to a temperature above its melting point in conjunction with the use of a suitable organic carrier to sufficiently remove the support material from the build material. In some cases, the organic carrier deposits an undesirable oily residue on the completed three-dimensional part. Furthermore, the use of elevated temperatures, in addition to a suitable organic carrier, in some situations can compromise the mechanical integrity of the finished three-dimensional part resulting in part deformation or failure.

To solve this problem, U.S. Pat. No. 5,503,785 suggests depositing a release material as a thin coating between the build material and the support material. The release material is a hydrocarbon wax or a water-soluble wax, acrylates, polyethylene oxide, glycol-based polymers, polyvinyl pyrrolidone-based polymers, methyl vinyl ethers, maleic acid-based polymers, polyoxazolidone-based polymers, Polyquarternium II or conventional mold release materials, such as fluorochemicals, silicones, paraffins or polyethylenes. Depending on the type of release layer, it may also leave an undesirable oily residue on the completed three-dimensional part. Moreover, the release layer adds complexity to the three-dimensional printing of the articles.

A well-known support material is High Impact Polystyrene (HIPS). After the 3D printing, HIPS can be dissolved in limonene to remove HIPS from the printed build material. Unfortunately, limonene has a low flash point and leaves hazardous toxic wastes.

Another known support material is polylactic acid (PLA). It can be dissolved in a heated sodium hydroxide solution, which is hazardous to handle. Unfortunately, PLA leaves corrosive, hazardous toxic wastes.

U.S. Pat. No. 6,070,107 discloses the use of poly(2-ethyl-2-oxazolidone) as water-soluble rapid prototyping support and mold material. Unfortunately, poly(2-ethyl-2-oxazolidone) is very tacky. Moreover, on thermal decomposition of poly(2-ethyl-2-oxazolidone) toxic fumes are generated, specifically nitrogen oxides and carbon oxide, as disclosed in its Material Safety Data Sheet.

It is well known to use polyvinyl alcohol (PVA) as a support material for ABS. PVA and ABS can be printed simultaneously. After the 3D printing has been completed, the printed article can be submerged in water. The PVA is dissolved in warm water and leaves the ABS portion of the printed article intact. Unfortunately, PVA is quite difficult to print, does not sufficiently adhere to ABS and takes a long time to dissolve. However, some adherence of the support material to the build material is very desirable to provide a good support and minimize warping of the build material.

In view of the deficiencies of support materials in three-dimensional printing, it would be desirable to provide a support material that avoids one or more of the problems of the prior art such as those described above.

A preferred object of the present invention is to provide a support material that is easily removable from the build material after three-dimensional printing of the support material and the build material. Another preferred object of the present invention is to provide a support material that does not leave substantially toxic or corrosive waste upon removal of the support material (e.g., is easily removed in neutral pH water). Yet another preferred object of the present invention is to provide a support material that has a reasonably good adhesion to the build material. To facilitate handling, yet another preferred object of the present invention is to provide a support material that has a low level of surface tackiness.

SUMMARY

Surprisingly, it has been found that certain hydroxyethyl methylcelluloses are very advantageous in three-dimensional printing.

Accordingly, a first aspect of the present invention is a three-dimensionally printed article comprising a hydroxyethyl methylcellulose having a DS of 1.7 to 2.5 and an MS of at least 0.5, wherein DS is the degree of substitution of methoxyl groups and MS is the molar substitution of hydroxyethoxyl groups. In a particular embodiment, the hydroxyethyl methylcellulose supports (support material) another material simultaneously printed (build material) in which the support material is subsequently removed after the three dimensionally printed article is formed.

A second aspect of the present invention is a method of printing a three-dimensional article which comprises selectively depositing layers of a build material to form a three-dimensional article; wherein at least a portion of a layer of the build material is supported by a support material, the support material comprising the above-mentioned hydroxyethyl methylcellulose.

DESCRIPTION

The three-dimensional printed article of the present invention typically comprises a build material and a support material, but in one embodiment, the three dimensional article may be comprised of the hydroxyethyl methylcellulose alone or with other additives described below (e.g., if one desires to make a water soluble three dimensional printed article).

In the embodiment comprising a build and support material, surprisingly, the hydroxyethyl methylcellulose can be subjected to three-dimensional printing techniques and can be utilized as or in a support material to support the build material of a three-dimensionally printed article. The hydroxyethyl methylcellulose can be removed from the build material of the three-dimensionally printed article with the aid of water and leaves a non-toxic, non-corrosive and bio-degradable residue in the water.

The hydroxyethyl methylcellulose has a cellulose backbone having β-1,4 glycosidically bound D-glucopyranose repeating units, designated as anhydroglucose units in the context of this invention. The degree of the substitution of hydroxyl groups of the anhydroglucose units by methyl groups and hydroxyethyl groups is essential in the present invention. The hydroxyl groups of the anhydroglucose units are not substituted by any groups other than methyl and hydroxyethyl groups.

The average number of methyl groups per anhydroglucose unit is designated as the degree of substitution of methyl groups, DS. In the definition of DS, the term "hydroxyl groups substituted by methyl groups" is to be construed within the present invention to include not only methylated hydroxyl groups directly bound to the carbon atoms of the cellulose backbone, but also methylated hydroxyl groups of hydroxyethyl substituents bound to the cellulose backbone.

The degree of the substitution of hydroxyl groups of the anhydroglucose units by hydroxyethyl groups is expressed by the molar substitution of hydroxyethyl groups, the MS. The MS is the average number of moles of hydroxyethyl groups per anhydroglucose unit in the hydroxyethyl methylcellulose. It is to be understood that during the hydroxyethylation reaction, the hydroxyl group of a hydroxyethyl group bound to the cellulose backbone can be further etherified by a methylation agent and/or a hydroxyethylation agent. Multiple subsequent hydroxyethylation reactions with respect to the same carbon atom position of an anhydroglucose unit yields a side chain, wherein multiple hydroxyethyl groups are covalently bound to each other by ether bonds, each side chain as a whole forming a hydroxyethyl substituent to the cellulose backbone. The term "hydroxyethyl groups" thus has to be interpreted in the context of the MS as referring to the hydroxyethyl groups as the constituting units of hydroxyethyl substituents, which either comprises a single hydroxyethyl group or a side chain as outlined above, wherein two or more hydroxyethyl units are covalently bound to each other by ether bonding. Within this definition, it is not important whether the terminal hydroxyl group of a hydroxyethyl substituent is further methylated or not; both methylated and non-methylated hydroxyethyl substituents are included for the determination of MS.

The hydroxyethyl methylcellulose utilized in the composition of the present invention has a DS of at least 1.7, preferably at least 1.8, more preferably at least 2. Hydroxyethyl methylcellulose generally has a DS of up to 3, more typically up to 2.5, and even more typically up to 2.4. Generally, when substitution of DS and MS is low the resulting HEMC typically fails to display the thermoplastic characteristics needed to 3D print adequately. Quite often, if the substitution is too low, the HEMC may pyrolyze instead of melt and flow and as a result is generally not suitable for 3D printing.

The hydroxyethyl methylcellulose utilized in the composition of the present invention has an MS of at least 0.5, preferably at least 0.8, and more preferably at least 1.0. The hydroxyethyl methylcellulose may have an MS of up to any practicable amount, but typically is up to 10, more typically up to 5 and most typically up to about 3.

The determination of the % methoxyl and % hydroxyethoxyl is carried out according to the United States Pharmacopeia (USP 35, "Hypromellose", pages 3467-3469). The values obtained are % methoxyl and % hydroxyethoxyl. These are subsequently converted into degree of substitution (DS) for methyl substituents and molar substitution (MS) for hydroxyethyl substituents. Residual amounts of salt are taken into account in the conversion.

The hydroxyethyl methylcellulose utilized in the composition of the present invention preferably has a viscosity of up to 100 mPa·s, more preferably up to 60 mPa·s, even more preferably up to 40 mPa·s, and most preferably up to 30 mPa·s, or up to 20 mPa·s, or up to 10 mPa·s, determined as a 2% by weight solution in water at 20° C. in a Haake VT550 Viscotester at a shear rate of 2.55 s$^{-1}$. The viscosity is preferably at least 1.2 mPa·s, and more preferably at least 2.4 mPa·s or at least 3 mPa·s. Hydroxyethyl methylcelluloses of such viscosity can be obtained by subjecting a hydroxyethyl methylcellulose of higher viscosity to a partial depolymerization process. Partial depolymerization processes are well known in the art and described, for example, in European Patent Applications EP 1,141,029; EP 210,917; EP 1,423,433; and U.S. Pat. No. 4,316,982.

The hydroxyethyl methylcelluloses may be synthesized by a known method such as described in U.S. Pat. No. 3,709,876, incorporated herein by reference.

When the hydroxyethyl methylcelluloses are used as a support material, it may comprise any useful amount of the desired 3 dimensional printed article. Typically, the support material in this embodiment comprises at most 5 weight percent, desirably at most 3 weight percent, and most desirably at most 1 weight percent of water, based on the total weight of the support material. Moreover, the support material preferably does not comprise more than 5 weight percent, more preferably not more than 3 weight percent, and even more preferably not more than 1 weight percent of an organic solvent having a boiling point of up to 230° C. at atmospheric pressure, based on the total weight of the support material. Most preferably the support material does not comprise water or an organic solvent having a boiling point of up to 230° C. at atmospheric pressure. In other words, the support material is essentially free of a solvent for the hydroxyethyl methylcellulose.

The support material may further comprise additives, different from the above-mentioned hydroxyethyl methylcellulose, such as rheological modifiers, stabilizers, fillers, plasticizers, pigments and/or impact modifiers. However, an advantage of the present invention is that the presence of such additives differs from the above-mentioned hydroxyethyl methylcellulose is optional. The support material does not require the content of a substantial amount or any amount of such additives. More specifically, the support material does not require the presence of a substantial amount or any amount of waxes, oils or lubricants which might leave an oily or waxy surface of the build material after removal of the support material.

When a filler is added to the hydroxyethyl methylcellulose, it may assist in the imparting of a desired property such as rheological, mechanical, coloration, or other function. Examples of fillers include inorganic particulates (e.g., carbon black, calcium carbonate, titanium oxide, carbon nanotubes, salt, clays and talc) and organic particulates (e.g., sugar, flour, and starch) and organic compounds, including, for example, dyes and pigments.

When a plasticizer is added to the hydroxyethyl methylcellulose, it may also assist in the imparting a desired property such as rheological, mechanical, coloration, or other function (e.g., lower the useable print temperature). The plasticizer may be any of those known in the art to plasticize ethyl cellulose polymers. Exemplary plasticizers include glycerine, dibutyl phthalate, diphenyl phthalate, castor oil, dicyclohexyl phthalate, butyl phthalyl butyl glycolate, cresyldiphenyl phosphate, butyl stearate, benzyl phthalate, triethylcitrate, dibutylsebacate, sorbitol and triacetin or mixture thereof.

Examples of surfactants that may be added to the hydroxyethyl methylcellulose are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.1 to 3 percent, based on the weight of the hydroxyethyl methylcellulose. Non-limiting examples of lubricants are, for example, polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants is from 0.1 to 10 percent, more typically from 0.3 to 6 percent, based on the weight of the hydroxyethyl methylcellulose.

Uniform mixing of the hydroxyethyl methylcellulose with one or more optional additives, e.g., selected from surfactants, lubricants, stabilizers and antioxidants to produce the support material can be accomplished by, for example, a known conventional kneading process.

The above-described hydroxyethyl methylcellulose generally amounts to at least 50 wt %, preferably at least 60 wt %, more preferably at least 70 wt %, and even more preferably at least 90 wt %, based on the total weight of the support material. The amount of the hydroxyethyl methylcellulose is up to and including 100 wt %, and preferably up to 95 wt %, based on the total weight of the support material.

To reiterate, an aspect of the present invention is three-dimensional printing of the hydroxyethyl methylcellulose disclosed further above and in a particular embodiment, the three-dimensional printing of the hydroxyethyl methylcellulose where it is a support material for at least one layer of a build material.

Known build materials are, e.g., thermoplastic polymers, such as polyoxymethylene, polylactic acid, ethylene vinyl acetate copolymers, polyphenylene ethylene-acrylic acid copolymer, polyether block amide, polyvinylidene fluoride, polyetherketone, polybutylene terephthalate, polyethylene terephthalate, polycyclohexylenemethylene terephthalate, polyphenylene sulfide, polythalaniide, polyinethylmethacrylate, polysulfones, polyethersulfones, polyphenylsulfones, polyacrylonitrile, poly(acrylonitrile-butadiene-styrene), polyamide, polystyrene, polyolefin, polyvinyl butyral, polycarbonate, polyvinyl chlorides, polyurethanes, polyethylenes, polypropylenes, and combinations, thereof. Preferred build materials are those known for fused deposition modeling (FDM) techniques, such as a poly(acrylonitrile-butadiene-styrene), a polycarbonate, polyimide, or polylactic acid.

Another aspect of the present invention is a method of printing a three-dimensional article which comprises: selectively depositing layers of a build material to form the three-dimensional article on a substrate; and supporting at least a portion of one of the layers of the build material with a support material, the support material comprising the above-described hydroxyethyl methylcellulose and optional additives as described above. Suitable substrates on which the three-dimensional article is formed are known in the art, such as plates or sheets made of glass, metal or synthetic materials, which may contain mold release agents or plastics having low surface energy such as fluoropolymers.

The method of the present invention is preferably carried out according to fused deposition modeling (FDM) or according to selective deposition modeling (SDM), wherein two different polymers are melted in separate nozzles and selectively printed, one being a build material and the other one being the support material. The build material and the support material can be heated to the same or different temperatures to bring them into a molten or softened shape. When the support material is comprised of the hydroxyethyl methylcellulose, it is typically heated to a temperature of at least 100° C., preferably at least 110° C. The temperature should generally not be above the temperature where the hydroxyethyl methylcellulose begins to degrade. Generally, the support material is heated to a temperature of up to 230° C., preferably up to 220° C., and more preferably up to 200° C. Typically the build material is also heated to a temperature of at least 100° C., or at least 110° C., and up to 230° C., or up to 220° C., or up to 200° C. The FDM process is described in U.S. Pat. No. 5,121,329, the teaching of which is incorporated herein by reference. Typically, the build material and/or support material, is selectively deposited according to an image of the three-dimensional article, the image being in a computer readable format. For example, the build material can be deposited according to preselected computer aided design (CAD) parameters. Typically, the build material solidifies upon deposition. In other embodiments, the build material may comprise a curable material, such as a photo-curable material.

In the method of the present invention wherein the support material comprises, substantially consists of, or consists of the above-described hydroxyethyl methylcellulose, at least a portion of one of the layers of the build material is supported with the support material. The support material is only temporarily needed. Upon hardening of the build material, e.g., by cooling, the support material is removed. For example, the hydroxyethyl methylcellulose is removed in a washing step wherein the hydroxyethyl methylcellulose dissolves in water, preferably in water at a low temperature such as less than 30° C. or at ambient temperature (e.g., 22° to 28° C.), leaving the build material behind that forms the actual desired three-dimensional object. For example, the entire three-dimensionally printed article comprising the build material and the support material is placed in a water bath or is contacted with running water so that the water dissolves the hydroxyethyl methylcellulose and leaves the desired three-dimensional object produced from the build material behind. During contacting with water, agitation may be employed to increase the rate of dissolution. Suitable agitation may include, for example, ultrasonic agitation. It is a great advantage of the present invention that the hydroxyethyl methylcellulose utilized as support material or as an essential component of the support material can be removed from the build material by simply contacting the support material with water and in particular water at ambient temperatures or below (20 or even 15° C.) and at a neutral pH or pH that is close to neutral (e.g., pH 6 to 8). The hydroxyethyl methylcellulose leaves non-toxic wastes. Moreover, at least in the preferred embodiments of the invention, the hydroxyethyl methylcellulose can be removed faster than support materials known in the prior art.

Some embodiments of the invention will now be described in detail in the following Examples.

EXAMPLES

Unless otherwise mentioned, all parts and percentages are by weight. In the Examples the following test procedures are used.

All printing was done using a MakerBot Replicator 2× Experimental™ printer (MakerBot Industries LLC, One MetroTech Center, 21st Floor, Brooklyn, N.Y. 11201). Temperature ranges investigated ranged from 100° C. to 250° C. which is the maximum temperature for the equipment.

HEMC Characterization:

The determination of the % methoxyl and % hydroxyethoxyl is carried out according to the United States Pharmacopeia (USP 35, "Hypromellose", pages 3467-3469). These are subsequently converted into degree of substitution (DS) for methoxyl substituents and molar substitution (MS) for hydroxyethoxyl substituents. The viscosity of the HEMC samples is determined as a 2% by weight solution in water at 20° C. in a Haake VT550 Viscotester at a shear rate of 2.55 s$^{-1}$.

Solubility

Solubility was measured by taking a 75 mm long filament and determining the time it takes to dissolve using a Fisher Scientific FS140 ultrasonic cleaner at full power (40 KHz) in room temperature (about 23° C.) neutral pH water.

Print Quality

Print quality was used to determine the applicability of the HEMC for 3D printing and the applicable print temperature ranges. The print quality was used in conjunction with the material properties of the HEMC filaments to grade the printability of the HEMC. For example, if the HEMC was too brittle (bendability too low, i.e., "too high a cm$^2$"), then the HEMC generally is not as suitable for 3D printing due to disruptions during printing that may occur due to breakage of the filament. An acceptable print quality is where the surface had essentially no flaws (no disruptions or voids) and good adhesion between the layers (maintained integrity upon manual handling).

Preparation of HEMC Filaments

Filaments for three-dimensional printing were produced from several hydroxyethyl methylcellulose (HEMC) powder samples having a DS (methyl), a MS (hydroxyethyl) and a viscosity as listed in Table 1 below. The HEMC Examples were prepared using a known method for etherification of alkalized cellulose such as described in U.S. Pat. No. 3,709,876. The etherification agents methyl chloride and ethylene oxide are added to alkali cellulose and reacted at elevated temperatures. The resulting crude HEMC is neutralized, washed free of chloride using hot water, dried and ground. The produced HEMC is subjected to partial depolymerization by heating the HEMC powder with gaseous hydrogen chloride at a temperature of 60-85° C. for 80-100 min.

TABLE 1

| Example | DS | MS | Viscosity (mPa · s) | Filament Extrusion Temp. (° C.) | Bendability (cm$^2$) | Solubility (min) | Lowest Print Temp (° C.) | Highest Print Temp (° C.) |
|---|---|---|---|---|---|---|---|---|
| 1 | 2.44 | 1.97 | 7.1 | 78 | 4.9 | 5 | 160 | 170 |
| 2 | 2.46 | 2.24 | 6.2 | 105 | 2.3 | 7 | 130 | 190 |
| 3 | 2.18 | 1.59 | 3.0 | 85 | 0.8 | 11 | 150 | 150 |
| 4 | 2.15 | 1.61 | 12.4 | 97 | 0.5 | 15 | 170 | 210 |
| 5 | 2.13 | 1.46 | 3.7 | 105 | 0.4 | 4 | 170 | 190 |
| 6 | 2.15 | 1.04 | 5.1 | 130 | 1.8 | 16 | 150 | 190 |
| 7 | 2.22 | 1.48 | 15.0 | 112 | 1.1 |  | 170 | 250 |
| 8 | 2.24 | 1.74 | 15.6 | 105 | 0.8 |  | 190 | 250 |
| 9 | 2.07 | 0.56 | 24.0 | 155 | 15.9 | 19 | 220 | 220 |
| 10 | 2.07 | 0.56 | 35.6 | 162 | 38.5 | 31 | 180 | 190 |
| 11 | 2.31 | 1.30 | 16.0 | 117 | 1.8 | >180 | 210 | 250 |
| 12 | 2.35 | 1.59 | 29.0 | 102 | 1.8 | 136 | 180 | 210 |
| 13 | 2.37 | 1.32 | 14.6 | 110 | 1.8 |  | 200 | 250 |
| 14 | 2.35 | 1.61 | 146.3 | 104 | 0.8 | 140 | 200 | 250 |
| Comp. 1 |  |  |  |  |  | 177 | 170 | 200 |

Bendability:

Bendability helps to describe how flexible the filament is and ultimately how tolerant the filament will be to handling and 3D printing. It is defined as the area of the smallest circle that the filament (1.75 mm diameter) can be bent into before the filament breaks. The more flexible the filament is, the smaller the area is given in cm$^2$. Generally, the bendability should be less than about 50 cm$^2$, but desirably is less than about 45 cm$^2$, 40 cm$^2$, 35 cm$^2$ or even 30 cm$^2$, to realize good print quality without disruptions during printing. The bendability may be any lower amount practicable such as even a fraction of a cm$^2$.

A capillary rheometer (Malvern RH10, Malvern Instruments) equipped with a die which is suitable to produce HEMC filaments of 1.75 mm is heated to the temperature as shown in Table 1 and filled with the HEMC powder. The vertical extrusion through the die is performed with a piston driving at about 5 mm/min. The resulting spaghetti-like filaments of 1.75 mm diameter are hardened by cooling to room temperature. They are subsequently used for the 3-D-printing step without any further treatment.

3-D Printing of HEMC Filaments Examples

A 3D Printer MakerBot Replicator 2X, which is commercially available from Stratasys Ltd, Minneapolis, Minn. (USA), is used for 3-D printing.

Printing trials are repeated several times with the various HEMCs of Table 1 wherein the 3D Printer is heated to different temperatures with varying platen temperatures. The samples displayed good 3-D print quality. The HEMC filaments can be easily loaded into the printer nozzle. All HEMC samples display good bonding between the individual layers of the HEMC material.

COMPARATIVE EXAMPLES

Comparative Example 1

Filaments having a diameter of 1.75 mm are produced from a polyvinyl alcohol (PVA) filament having a diameter of 1.75 mm. The polyvinyl alcohol filament is commercially available from Matterhackers, Orange County, Calif. Polyvinyl alcohol is a known support material for three-dimensional printing which is considered as the material which is easiest and fastest to remove after three-dimensional printing. The solubility in water of the Comparative Example 1 was determined in the same manner as described above and is shown in Table 1.

The invention claimed is:

1. A three-dimensionally printed article comprising a hydroxyethyl methylcellulose having a DS of 1.7 to 2.5 and an MS of at least 0.5, wherein DS is the degree of substitution of methoxyl groups and MS is the molar substitution of hydroxyethoxyl groups, wherein the article is comprised of a plurality of layers of the hydroxyethyl methyl cellulose.

2. The article of claim 1 wherein the three-dimensionally printed article is comprised of a build material and a support material and the hydroxyethyl methylcellulose is the support material for the build material.

3. The article of claim 1, wherein the hydroxyethyl methylcellulose has a DS of at least 1.8.

4. The article of claim 2 wherein the build material comprises a thermoplastic material.

5. The article of claim 4, wherein the build material is comprised of at least one of a polyolefin, poly(acrylonitrile-butadiene-styrene), polycarbonate, polylactic acid and polyamide.

6. The article of claim 1, wherein the hydroxyethyl methylcellulose has a DS of from 1.8 to 2.5.

7. The article of claim 1, wherein the hydroxyethyl methylcellulose has an MS of from 0.5 to 10.

8. The article of claim 1, wherein the hydroxyethyl methylcellulose is comprised of at least one of a filler, dye, lubricant, surfactant, plasticizer or stabilizer.

9. The article of claim 1, wherein the hydroxyethyl methylcellulose is further comprised of a plasticizer.

10. The article of claim 1, wherein the hydroxyethyl methylcellulose has no plasticizer.

11. The article of claim 1, wherein the hydroxyethyl methylcellulose has a viscosity of 100 mPa×s or less, the viscosity being measured at a shear rate of 2.55 s−1 of a 2 weight percent solution of the hydroxyethyl methylcellulose in water at 20° C.

12. A method of printing a three-dimensional article comprising: selectively depositing layers of a build material to form the three dimensional article on a substrate; and
supporting at least one of the layers of the build material with a support material, the support material comprising hydroxyethyl methylcellulose having a DS of 1.8 to 2.5 and an MS of at least 0.5 to 2.5, wherein DS is the degree of substitution of methoxyl groups and MS is the molar substitution of hydroxyethoxyl groups.

13. The method of claim 12 wherein at least one of the layers of the build is supported with a support material set forth in any one of claims 2 to 7.

14. The method of claim 12, wherein the layers of the build material are deposited according to an image of the three-dimensional article in a computer readable format.

15. The method of claim 12 further comprising removing the support material from the build material by contacting the support material with water.

16. The method of claim 15, wherein the water has a neutral pH.

17. The method of claim 16, wherein the water is at a temperature of at most about 30° C.

18. The method of claim 12, wherein the selectively depositing layers are deposited by heating the build material and support material.

19. The method of claim 18, wherein the heating temperature is greater than 100° C. to 220° C.

* * * * *